Nov. 22, 1949     J. P. GLASS, JR     2,488,771
INDUCTION DEVICES HAVING A SUBSTANTIALLY PURE SINE
RELATION BETWEEN THE COUPLING AND THE RELATIVE
DISPLACEMENT OF ITS ELEMENTS

Filed Aug. 21, 1944     8 Sheets-Sheet 1

Witness:
Ed Sinclair Smith

Inventor
John P. Glass, Jr.
By Cerstvik + Kalman
Attorneys

Nov. 22, 1949  J. P. GLASS, JR  2,488,771
INDUCTION DEVICES HAVING A SUBSTANTIALLY PURE SINE
RELATION BETWEEN THE COUPLING AND THE RELATIVE
DISPLACEMENT OF ITS ELEMENTS
Filed Aug. 21, 1944  8 Sheets-Sheet 2

DOES NOT RELY
ON Y CONNECTION

USES Y CONNECTION

Inventor
John P. Glass, Jr.

By Cerstvik + Kalman
Attorneys

Witness:
Ed Sinclair Smith

Nov. 22, 1949 J. P. GLASS, JR 2,488,771
INDUCTION DEVICES HAVING A SUBSTANTIALLY PURE SINE
RELATION BETWEEN THE COUPLING AND THE RELATIVE
DISPLACEMENT OF ITS ELEMENTS
Filed Aug. 21, 1944 8 Sheets-Sheet 3
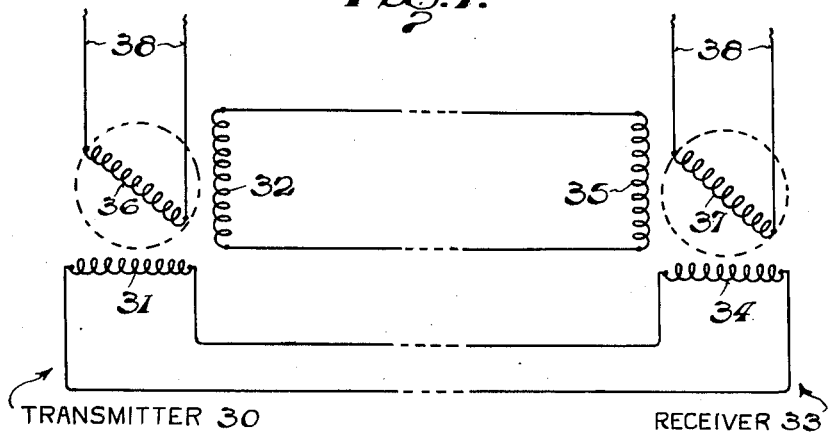
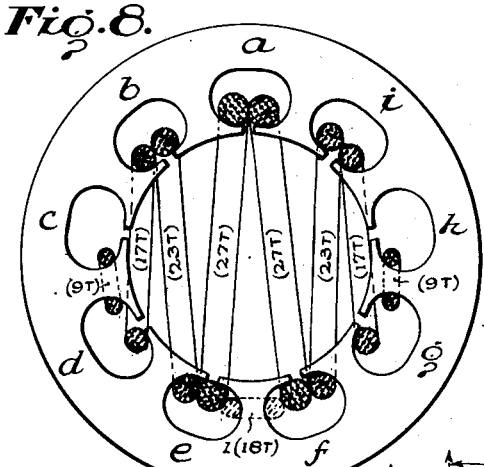
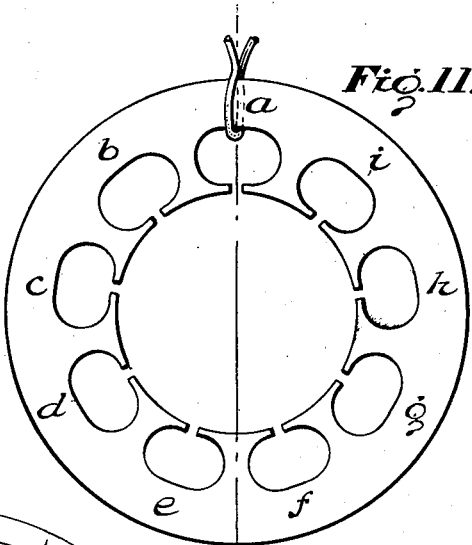
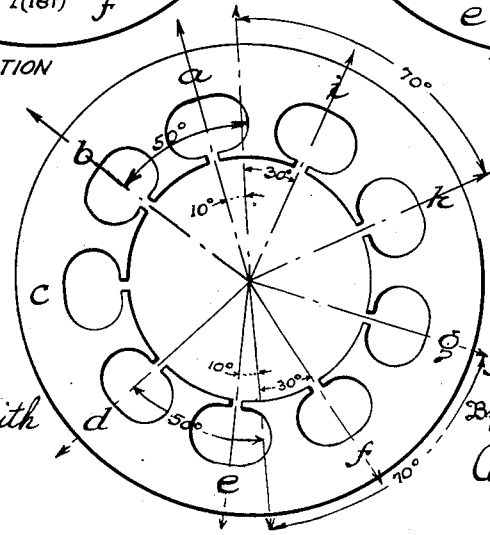
Witness:
Ed Sinclair Smith
Inventor
John P. Glass, Jr.
By
Cerstvik + Kalman
Attorneys

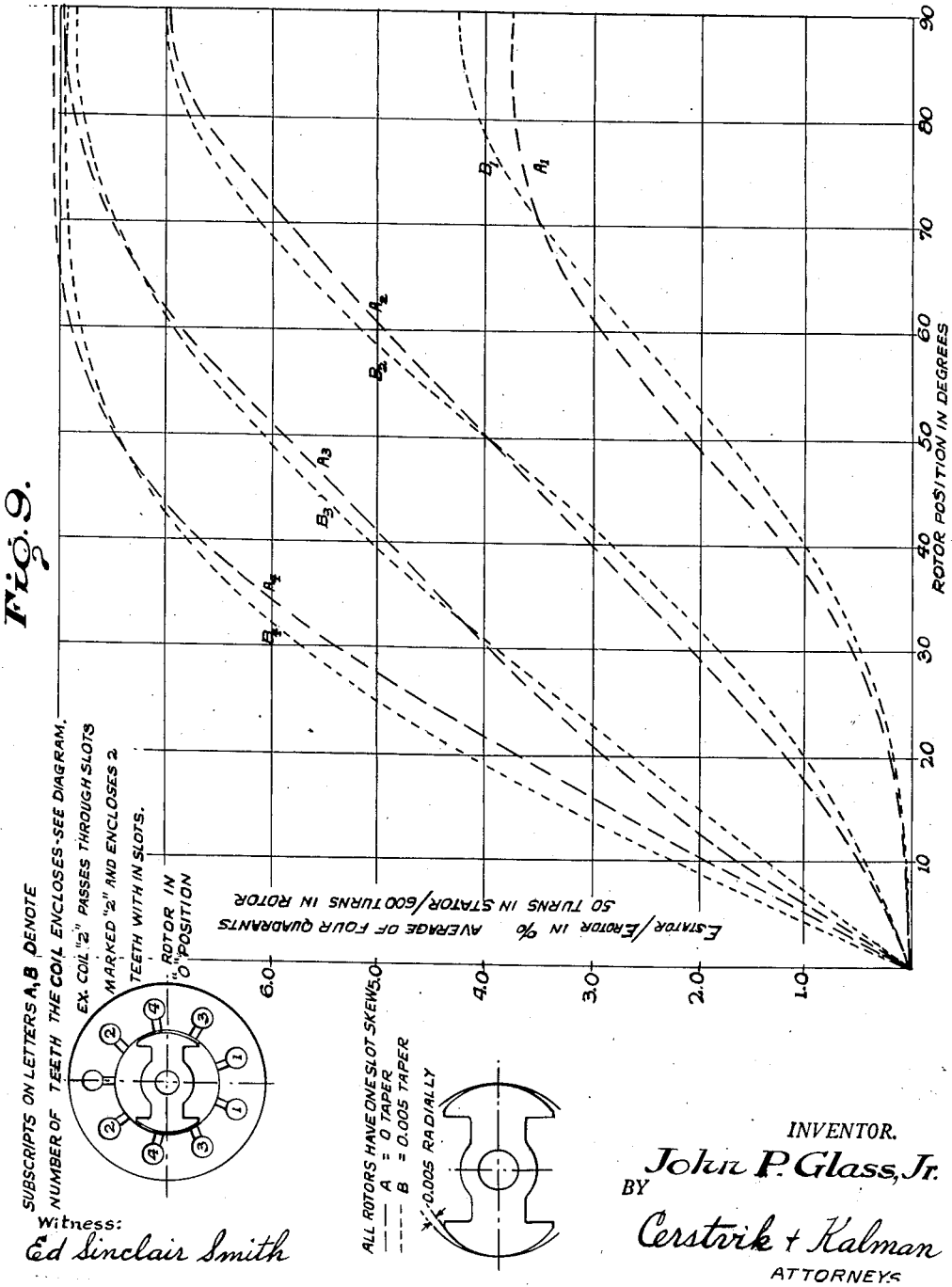

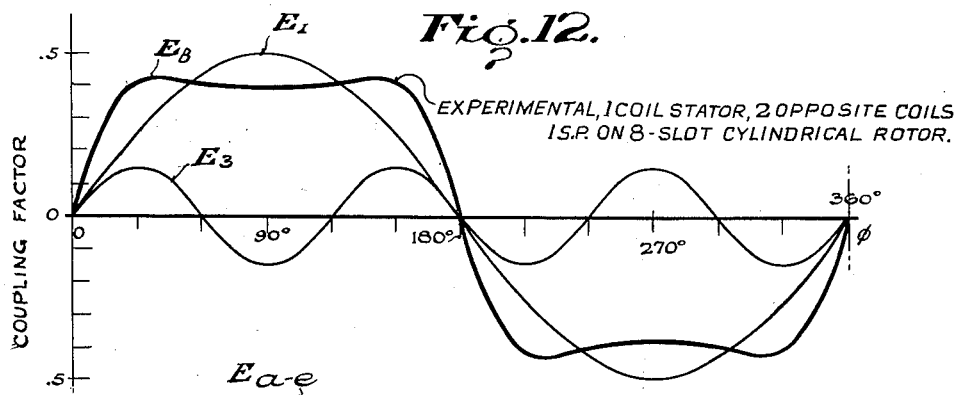
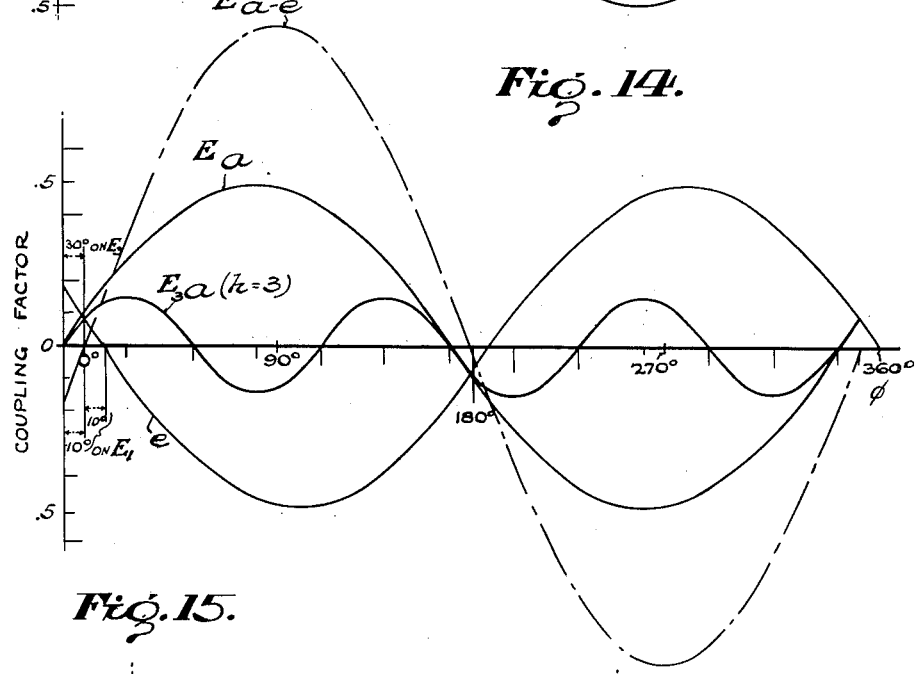
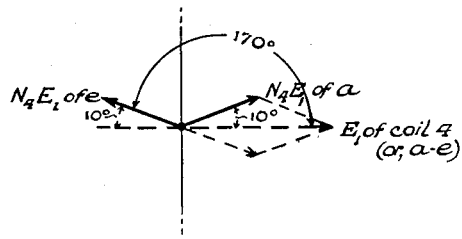
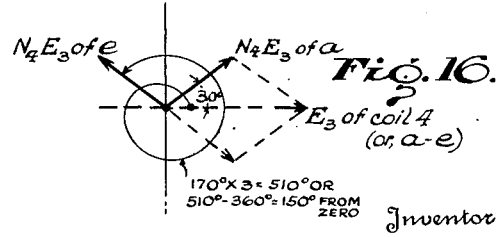

Nov. 22, 1949     J. P. GLASS, JR     2,488,771
INDUCTION DEVICES HAVING A SUBSTANTIALLY PURE SINE
RELATION BETWEEN THE COUPLING AND THE RELATIVE
DISPLACEMENT OF ITS ELEMENTS
Filed Aug. 21, 1944     8 Sheets-Sheet 7
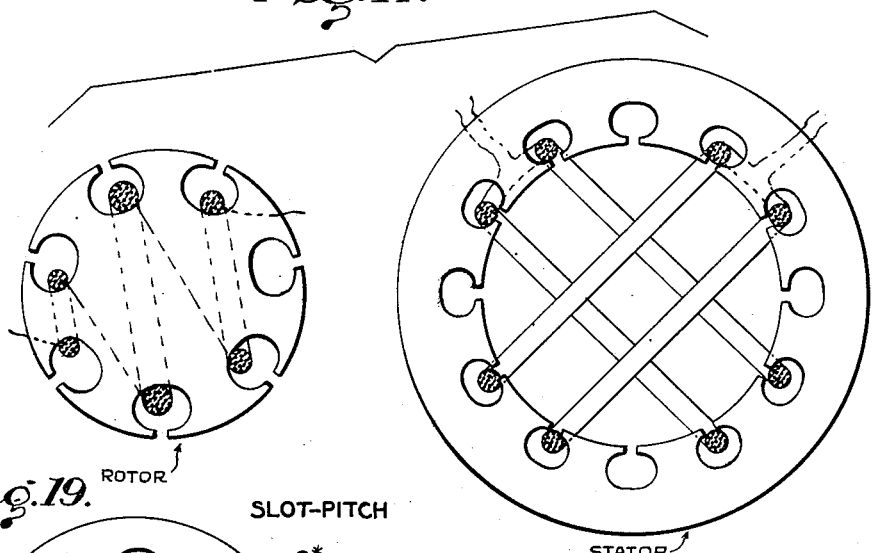
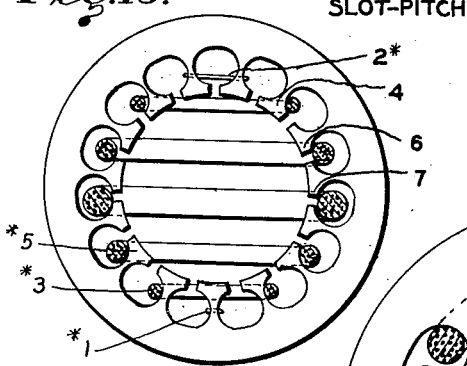
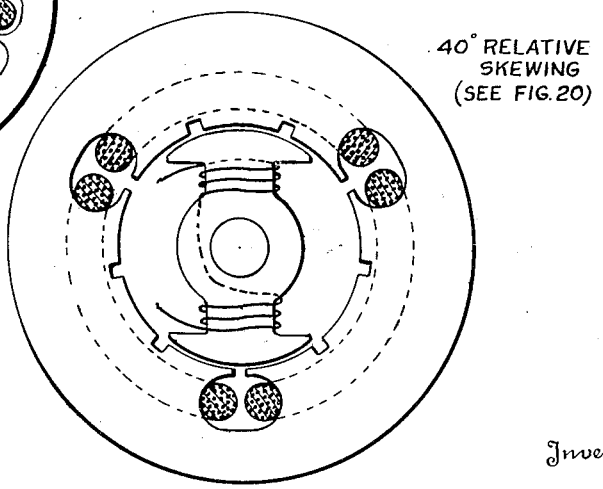

Nov. 22, 1949         J. P. GLASS, JR         2,488,771
INDUCTION DEVICES HAVING A SUBSTANTIALLY PURE SINE
RELATION BETWEEN THE COUPLING AND THE RELATIVE
DISPLACEMENT OF ITS ELEMENTS

Filed Aug. 21, 1944         8 Sheets-Sheet 8

USES Y CONNECTION

WITNESS:
Ed Sinclair Smith

INVENTOR
JOHN P. GLASS, JR.
BY
Cerstvik & Kalman
ATTORNEYS

Patented Nov. 22, 1949

2,488,771

UNITED STATES PATENT OFFICE 2,488,771

INDUCTION DEVICE HAVING A SUBSTANTIALLY PURE SINE RELATION BETWEEN THE COUPLING AND THE RELATIVE DISPLACEMENT OF ITS ELEMENTS

John P. Glass, Jr., West New York, N. J., assignor to Bendix Aviation Corporation, Teterboro, N. J., a corporation of Delaware Application August 21, 1944, Serial No. 550,461

38 Claims. (Cl. 318—24)

This invention relates to electrical devices having relatively movable parts whether the latter are rotated or translated linearly from one position to another. It particularly relates to accurate telemetric servo-operation by simultaneous movements of rotors in transmitting and receiving devices, and especially when they are of the well-known "synchro" or self-synchronous motor type having 3-phase stators.

A general object of the invention is to provide, with such devices, novel methods of and means for the production of substantially pure sinusoidal voltage and impedance variations with rotor angular position.

One specific object is to provide a highly accurate telemeter by the substantial elimination of errors due to rotor characteristics. Another is the improvement of accuracy by novel methods of and means for minimizing inaccuracies in telemetering due to the stators, said methods and means relating to the novel distribution of the stator windings.

An important object is the provision of servo-operated telemetric means for obtaining highly accurate control, particularly by the use of highly accurate telemetric transmitter and receiver synchros, with the latter preferably driven to null by a servomotor governed by the signal difference.

Another general object is to provide electrical engineers with a new tool for use in predetermining the design of electrical devices having rotors to give optimum performance, which is important in either large or high-speed generators and motors, in pure sine generators, and in telemeters of the self-synchronous type. I have found that the performance of both generators and motors is improved by the reduction to a minimum of the harmonic components which are generally attenuated and lost in transmission with a corresponding loss in efficiency.

The above and other objects and novel features of the invention will more fully appear from the following detailed description when the same is read in connection with the accompanying drawings. It is to be expressly understood, however, that the drawings are for the purposes of illustration only and are not intended as a definition of the limits of the invention.

Heretofore it has been the practice to seek accuracy of telemetering by making self-synchronous transmitters and receivers alike and relying upon the matching of their characteristics. But this practice has not proved adequate since practical manufacturing tolerances are too large for high accuracy unless special provisions are made. I have discovered that there are great advantages in telemetering obtained by minimizing departures from a pure sinusoidal output according to the present invention.

It is known that any graph of either voltage or impedance against either angular position or time may be analyzed on the basis of a Fourier series with any desired degree of closeness by the use of a sufficient number of terms. In accordance with the present invention, there is provided a distribution of windings in the stator and/or rotor to substantially eliminate all harmonics which could substantially affect the performance. Further the invention includes a new technique in the use of the Fourier analysis to make possible for the first time the straightforward design of such stators, e. g., instead of requiring the testing of a succession of experimental models. This approach of eliminating the harmonics by accurately cancelling them is more efficient than any scheme, such as in, e. g., the United States Patent 2,348,572 issued to P. H. Richardson, in which the harmonics are first formed and subsequently attenuated and wasted. And the techniques are radically different.

Before going into details, a general brief preview is had of the instant approach. For example, by the use of a bisymmetrical 2-pole rotor, a stator coil voltage $E_s$ and its angle $\phi$ may be represented by $$E_s = E_1 \sin \phi + E_3 \sin 3\phi + E_5 \sin 5\phi + E_7 \sin 7\phi + \ldots \quad (1)$$

both the cosine terms and all even sine terms having been eliminated by the rotor bisymmetry. By using a 3-phase stator, e. g., Y-connected, the 3rd and 9th harmonics cancel out as is well known. This leaves the 5th and other higher harmonics with their amplitude diminishing rapidly with the order of the harmonic, with the 5th and 7th harmonics as the main sources of error. With a salient-pole rotor, either of the 5th or 7th harmonics may be substantially eliminated, or both considerably reduced (but not substantially eliminated), by tapering the pole faces consistent with their width as is already known.

But when a shaped-pole rotor is used in a receiver and for any reason its driving servo fails, said rotor introduces errors into the system which destroy the accuracy in other parallel receivers. This makes a cylindrical non-salient pole rotor highly desirable. Since stators having 2-pole rotors preferably use only odd numbers of slots to minimize errors, for non-split windings and 3-phase stators, the number of slots in practice would be odd integer-multiples of 3 and the possible number of slots in the stator would be 3, 9, 15, 21, 27, 33, . . .

Taking, for example, a 9-slot stator and an 8-slot circular non-salient 2-pole rotor with approximately one-slot relative skewing of stator and rotor, the number of bars in the several slots may be adjusted according to the present invention to give substantially complete elimination of the 5th and 7th harmonics, parallel coils, or inductive equivalents, with unequal numbers of turns being thus used in the stator under the instant invention.

After reaching this concept, then from inspection of graphs of $E_s/E_r$ for different rotor angles, where $E_s$ and $E_r$ are respectively the voltages across the stator (i. e. across the phase under consideration) and across the rotor, I changed the coil winding distribution from 100, 50 for one phase to 80, 50, 20 (or about 53⅓, 33⅓, 13⅓% of the total turns per phase) with a marked improvement in the performance.

However, by my hereinafter explained modification of the Fourier analysis, the percentages become 53.2, 34.7, 12.1 and the elimination of the 3rd through the 9th harmonics is substantially complete and independent of the characteristics for any symmetrical rotor, a matter of practical importance. This produces in a 3-phase self-synchronous servo-telemetric system both a much higher accuracy and a much lower residual null-voltage which permits the use of a much more sensitive servo-drive for the receiver. Further, by the Fourier analysis modified according to the present invention, with a 9-slot stator, a 2-pole symmetrical rotor, and a Y-connection not desired, four coils may be used with 34.7, 30.5, 22.7 and 12.1% of the total turns per phase with (due to symmetry of harmonics about the 9th) negligible harmonics from the 3rd through the 15th, and no higher harmonics produced in appreciable amounts.

And, for special purposes, the requirements may similarly be met by the thus-modified Fourier analysis. For example, a virtually equal winding at right angles to the aforementioned parallel coils to provide two components at right angles, may be by a winding made of a ladder of split-coils halving the 34.7, 30.5, 22.7, 12.1% values noted earlier herein.

The foregoing résumé illustrates both the power and the flexibility of the method of the present invention.

In the drawings, wherein like characters of reference indicate like parts throughout;

Figure 7 is a conventional wiring diagram for a 2-phase telemeter in which the 2 phases are normal to each other for the stator and a single phase winding is used for the rotors;

Figure 8 is a coil-distribution for a 9-slot stator with a ladder-type coil made according to the invention and shown normal to that of Figure 5, only the lower coil of Figure 5 being shown in dotted lines in the bottom of Figure 8 to show the relative orientation of the coils for the two phases;

Figure 9 is a graph showing the relation between rotor angle and the coupling factor for a 9-slot stator and a salient 2-pole rotor with both zero and 0.005 inch taper as shown in one pilot diagram while the other shows the angular reference zero;

Figure 11 is a diagram of a 9-slot stator showing one bar and the reference axis of the rotor;

Figure 12 is a graph showing the coupling factor for one phase with the fundamental and third harmonic plotted against time;

Figure 13 is a diagram for a 9-slot stator showing the position of the reference axis for symmetry about an axis normal to the reference axis;

Figure 14 is a graph having the same coordinates as Figure 12 but showing the fundamental for the 4 slot pitch coil a—e of Figure 13 with the fundamental shifted 10° and the third harmonic at 30° from the reference axis for Figure 13;

Figure 15 is a vector diagram for the fundamental of the graph of Figure 14;

Figure 16 is a similar vector diagram for the third harmonic of Figure 14;

Figure 17 is a wiring diagram for a 7-slot single-phase rotor working in a 12-slot normal 2-phase stator with the rotor winding according to the invention;

Figure 5:
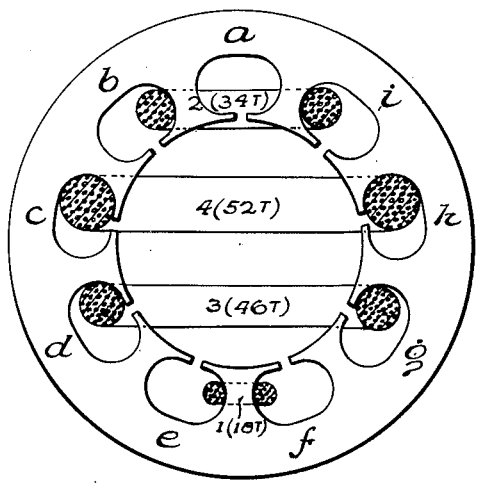
Figures 5 and 6 are diagrams for 9-slot stators with the distribution of windings made according to the invention to eliminate harmonics, in Figure 5 there is no reliance upon e. g., the Y-connection to eliminate the third harmonic while Figure 6 requires a Y-connection to eliminate the third harmonic.
Figure 6:
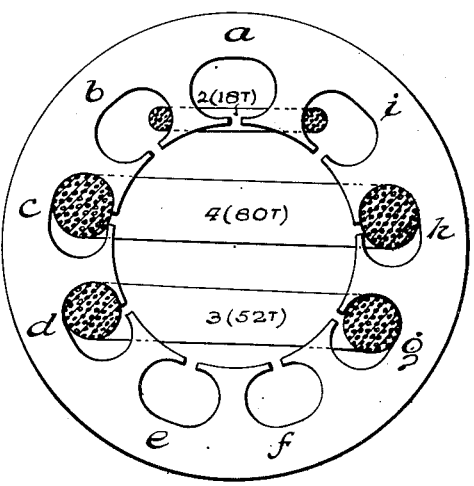
Figure 20:
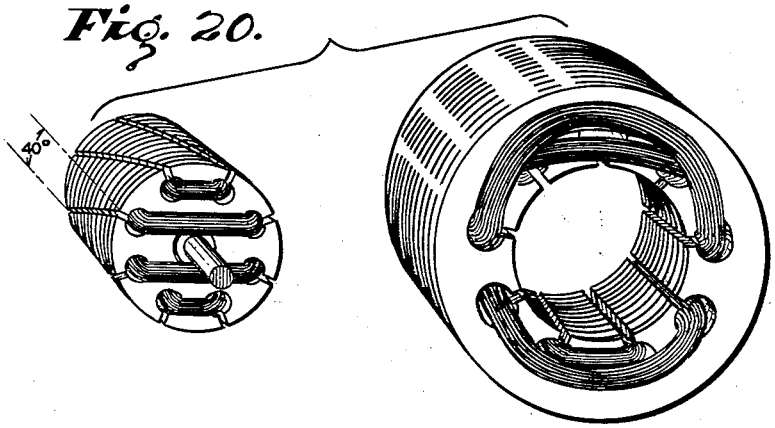
Figure 21:
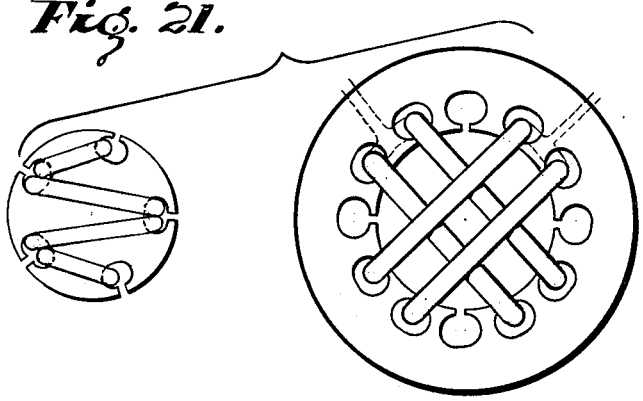
Figure 22:
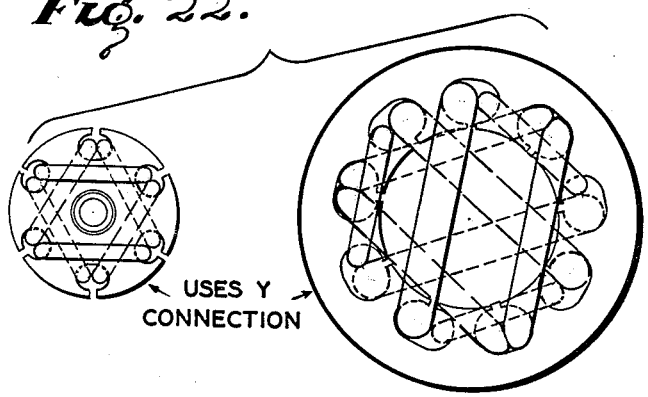

Figure 18 is a similar diagram of a salient 2-pole tapered rotor in a 3-coil 3-slot stator with 6-dummy-slots to effectively constitute a 9-slot stator;

Figure 19 is a winding diagram generally similar to Figures 5 and 6 showing the possible positions of independent parallel coils in a stator having an odd number of slots, fifteen being shown by way of example;

Figure 20 is an exploded isometric view, somewhat diagrammatic, of an induction device having an 8-slot bisymmetrical rotor and a 9-slot stator in which the winding distribution is novel;

Figure 21 is a wiring diagram of an inductive device having the bisymmetrical stator of Figure 17 and a 5-slot rotor having a novel winding distribution; and Figure 22 is a view, generally similar to that of Figure 20, of an induction device having a Y-connected 6-slot rotor with each of its 3 phase-windings bisymmetrical and a Y-connected stator as in Figure 6 as to its novel winding distribution for each phase but with these windings also Y-connected.

Figure 1:
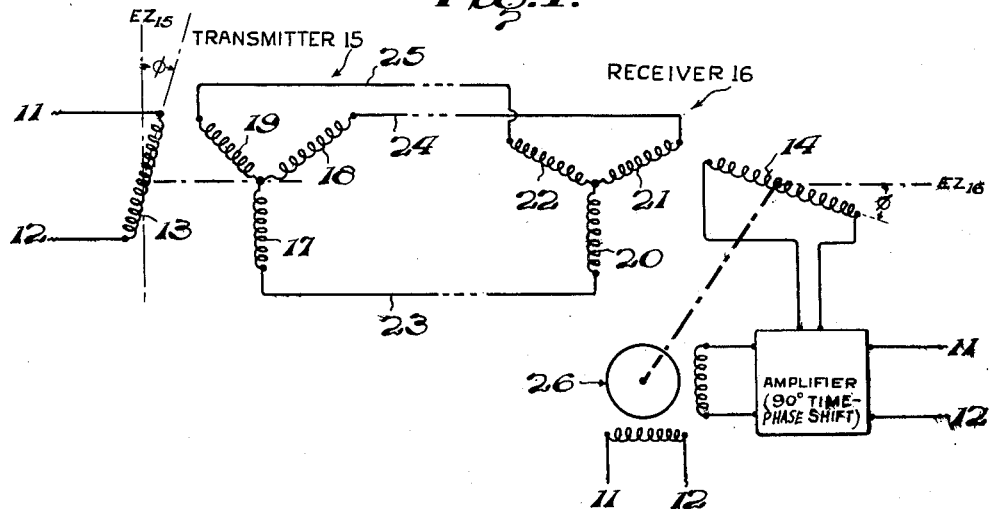
Figure 1 is a diagram of a conventional self-synchronous servo-telemetric system.

Consider a well-known self-synchronous servo telemeter with similar, except for the servo, transmitter and receiver units as diagrammatically shown in Figure 1. A. C. supply lines 11 and 12 are connected with rotor coil 13 of the respective transmitter and receiver units 15 and 16. Units 15 and 16 respectively have 3 phases 17, 18, 19 and 20, 21, 22 Y-connected by lines 23, 24, 25. The equilibrium position is shown, the receiver coil 14 there being at right angles with the transmitter coil 13 and the flux in the receiver to minimize the voltage output of coil 14. The zero reference position at the transmitter is $EZ_{15}$ taken with coil 13 parallel with the depending phase 17, and that, $EZ_{16}$, for the receiver is normal to the plane of depending phase 20. In spite of the fact that rotor coils 13 and 14 do not have like positions even at this zero reference condition, I have discovered that pure sinusoidal outputs produce precisely equal angular movements of rotor coils 13 and 14 for equilibrium.

The two phase motor 26 is operated in accordance with the phase difference of the amplified output of receiver rotor 14 from the A. C. supply to produce the stated equilibrium condition, a 90° phase difference being provided, e. g., in the amplifier.

Then, allowing for the 90° difference, the zero references $EZ_{15}$ and $EZ_{16}$ can both be brought into parallelism with the depending phases 17 and 20 respectively of the transmitter and the receiver for the purpose of determining telemetric error.

Instead of having a single coil for each phase, actually a 9-slot stator may be used with a plurality of coils per phase. These could be conventionally wound as in Figure 2 as far as one phase is concerned. With a two-pole bisymmetrical rotor parallel to coil $c$—$h$, which coils $b$—$g$ and $d$—$i$ supplement, all the cosine terms and even harmonic sine terms drop out. For the instant example, each of the three coils has 50 turns.

Figure 2:
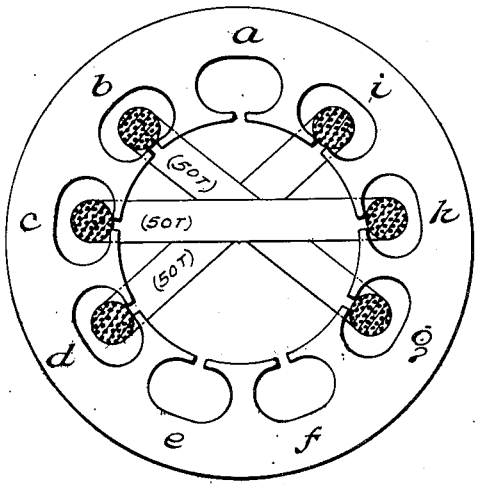
Figure 2 is a diagram showing a typical stator with a conventional coil distribution, the coils having an equal number of turns and being progressively spaced by equal angles.
Figure 3:
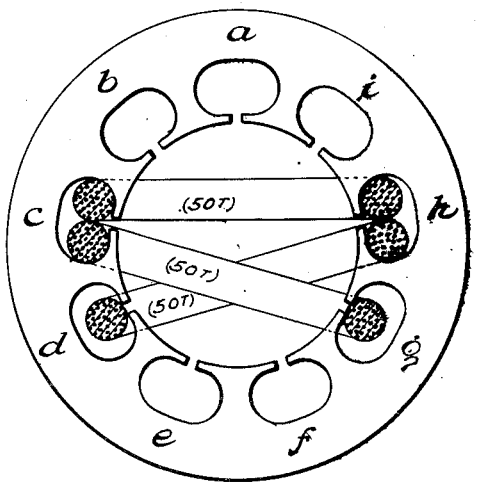
Figure 3 is a similar diagram showing a common distribution of like coils suitable for 3-phase systems.

But for a 3-phase 9-slot stator, the coils are conventionally modified as in Figure 3 to have like coils for each phase by having each phase occupy one-third of the total number of slots, 3 in this case. Thus we have coils $c$—$h$, $c$—$g$, and $d$—$h$, each having 50 turns as in Figure 2.

Figure 4:
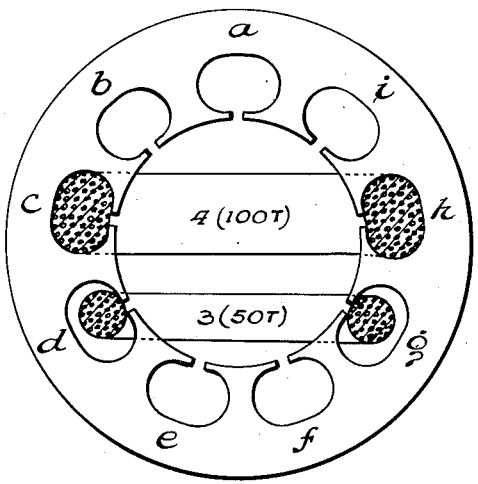
Figure 4 is a similar diagram of another more or less conventional winding giving results identical with those of Figure 3.

As a matter of reducing the labor of winding and tying, but with no significant or perceptible change of the electromagnetic effect, these coils may be more or less conventionally rearranged, as shown in Figure 4 without changing the electrical characteristics of the winding and hence without coming within the present invention. The ends of the bars which form the parallel coils may be reconnected to form equivalent coils in which the direction-sense of the several bars is not altered, many alternative coil patterns being possible without affecting the electrical characteristics. The parallel coils are described both for the sake of clarity and as the preferred embodiment.

Coil $c$—$h$ encloses 4 teeth in the shorter path and has 100 turns. Coil $d$—$g$ similarly encloses 3 teeth and has 50 turns. This arrangement has objectionably large 5th and 7th harmonics present when a circular rotor is used, said harmonics respectively appearing in Equation 1 hereinbefore as:

$$E_5 \sin 5\phi \text{ and } E_7 \sin 7\phi$$

As has earlier been noted, the 5th harmonic may be substantially eliminated and the 7th materially reduced by the use of a slight taper on the ends of the two salient poles. This feature will be considered further later herein and is considered to be one part of the invention only in cooperation with the highly special stator of Fig. 18. Alternatively one harmonic, e. g., the 5th, may be eliminated in the old winding of Fig. 2 by using the 5×40°=200° electrical angle between the coils with 0.5 N/cos 20°=0.532 N turns for each of the side coils $b$—$g$ and $d$—$i$ for N turns of coil $c$—$h$.

But another, and commercially better, solution exists in another part of the invention. It was realized that, with a 9-slot stator, a maximum of four parallel coils can be used in each phase. The main point here is that a maximum of only four independent coils per phase is possible in a 9-slot stator. As will be shown later for substantially complete elimination of the odd harmonics from the 3rd through the 15th, the 3rd harmonic being eliminated without the use of a 3-phase stator, N turns per phase in the coils, identified by the subscript using number of teeth in the shorter path, is as follows expressed both in per cent of the total number per phase and in the actual number of turns per phase:

| Coil, s. p. | Per cent | Turns |
|---|---|---|
| $N_4$ | 34.73 | 52 |
| $N_3$ | 30.54 | 46 |
| $N_2$ | 22.67 | 34 |
| $N_1$ | 12.06 | 18 |
| | 100.00 | 150 |

These coils are correspondingly identified in Figure 5. In other words, two coils have been added to those in Figure 4 and an improved performance obtained, including freedom from any effect due to the characteristics of a round rotor having two symmetrical poles, the rotor now being preferably of the non-salient pole type.

Also within the invention, I discovered that, as in Figure 6, a single coil could be added to the two of Figure 4 with the same improvement in the performance, the principal difference being that the winding is simpler while equally effective for a 3-phase Y-connected stator. The winding relation is as follows:

| Coil | Per cent | Turns |
|---|---|---|
| $N_4$ | 53.2 | 80 |
| $N_3$ | 34.7 | 52 |
| $N_2$ | 12.1 | 18 |
| | 100.0 | 150 |

In other words, there has been dropped from Figure 5 the coil $N_1$ which has the lowest coupling factor for the fundamental and is the most difficult to install.

The addition of any $N_2$ coil to the phase winding of a 9-slot stator provides an improvement in direct ratio as the correct value of turns for $N_2$ is approached.

A somewhat different embodiment is shown in the common application of Figure 7 in which the transmitter 30 sets up sine and cosine components in the normal phases 31 and 32. Receiver 33 has like normal phases 34 and 35. The rotors 36 and 37 respectively for transmitter and receiver are connected with the common A. C. supply 38 with the result that an angular movement of transmitter rotor 36 produces a like movement of receiver rotor 37 to a new equilibrium position as is well known.

Under the invention, one phase for the 9-slot stator is made as shown in Figure 5 while the normal phase is made as the ladder coil of Figure 8. Due to the average angularity of the coils, approximately 1.5% more turns are needed. It is apparent from Figure 8 that the 4 coils of Figure 5 are split into 8 coils as follows:

| Coils | Per cent | Turns |
|---|---|---|
| 2N₁' | 34.73 | 54 |
| 2N₂' | 30.54 | 46 |
| 2N₃' | 22.67 | 34 |
| 2N₄' | 12.06 | 18 |
|  | 100.00 | 152 |

Both coils N₁' for example may have 9 turns, coils N₁' being coils c—d and g—h. This phase enjoys the same freedom from harmonics as that, shown in Figure 5, to which it is normal. By selecting a different total number of turns, the integer-turns more closely approximate the correct percentages.

Referring to Figure 8, the coupling for low-order harmonics in one sense between the two phases in any given slot, e. g. slot e, is completely neutralized by identical coupling in the opposite sense in a complementary slot, that in slot f. To avoid confusion, only coil e—f of the other phase is shown (dotted) in Figure 8.

As earlier mentioned in connection with Figures 2-4, the 5th harmonic may be substantially eliminated by means of the right amount of taper for the width of face of a salient 2-pole rotor. Thus, referring to Figure 9, a taper of 0.005" is best for a rotor of 0.322" width and 0.495" diameter with 0.0025" air-gap minimum.

The graph on Figure 9 shows the voltage for the stator in per cent of that for the rotor for different positions of the rotor from the zero shown on its pilot diagram of the stator windings. Curve A₃, e. g., shows the relation with zero taper to be non-sinusoidal with a strong 5th harmonic while curve B₃ for the 0.005" taper rotor is a substantially pure sine, the curve for this coil which encloses 3 teeth in the shorter path being a fair average considering the coupling weights of the several coils. The other B curves contain substantial 3rd harmonics only, which, however, are neutralized by, e. g., the Y-connection.

As earlier noted, this rotor is one means of carrying out the method of obtaining superior accuracy of telemetering by providing a substantially pure sinusoidal coupling between stator and rotor as the rotor's angular position changes. While deformed magnetic surfaces defining air-gaps are well known in the motor and generator art, the use of precisely sine-matched taper and pole-width in self-synchronous telemeters solved a problem which was long faced by skilled workers in this art.

Figure 10:
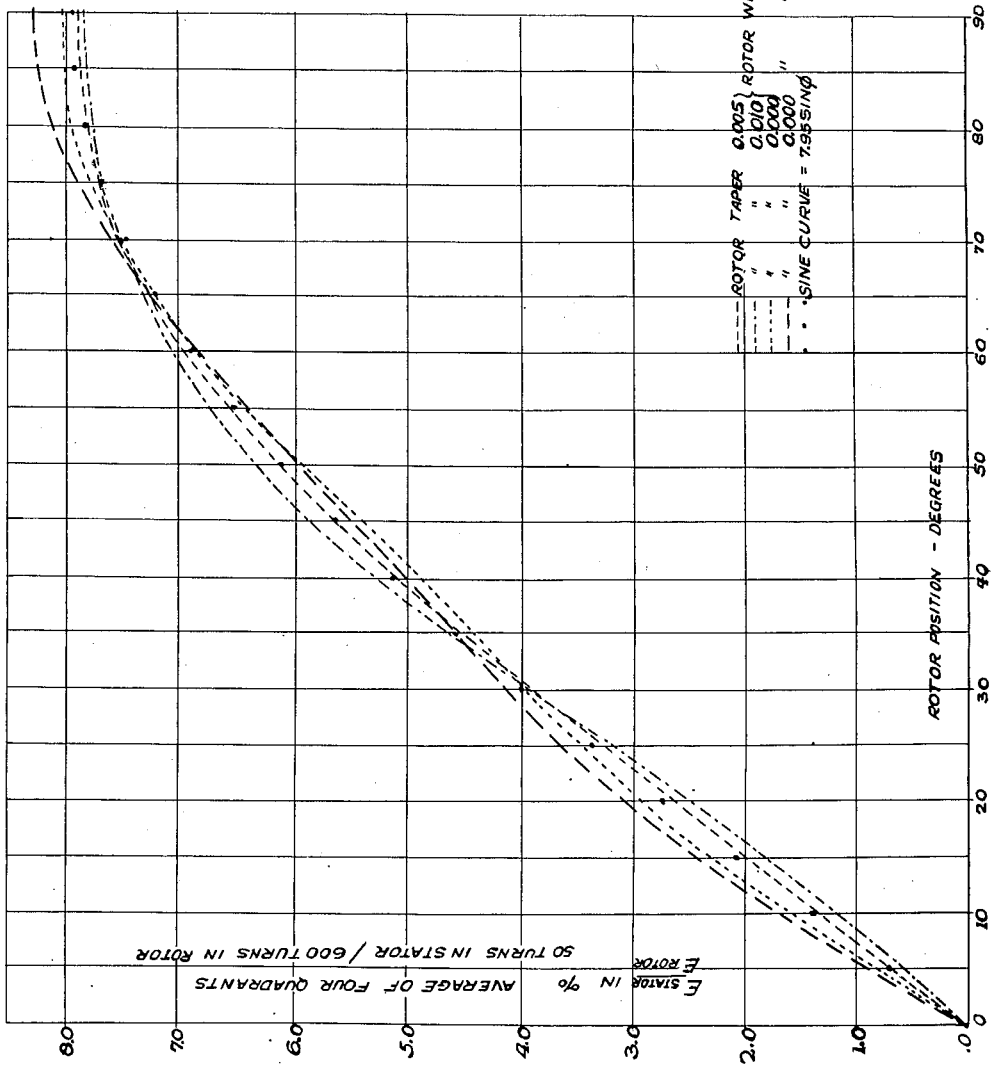
Figure 10 is a similar graph for the 3-slot pitch coil for several rotor widths and tapers.

Figure 10 is a similar graph in which the 3-tooth coil's voltage ratio is compared with a pure sine curve for several different tapers and two rotor widths. This shows that the earlier-stated rotor taper gives optimum performance and that it narrows the effective width of the rotor. In other words, the narrower rotor requires the smaller taper.

The consideration of such graphs as that of Figure 9 also led to the production of a substantially pure sine relation by the addition of coil 2 with an adjustment of the number of turns in the other coils, as shown in Figure 6. This added means brought the circulating currents in the 3 phases into phase as regards time, when the rotors at transmitter and receiver are in corresponding positions, by eliminating the 5th and 7th harmonics from the impedances.

This also provided a better null-voltage since the poor null with conventional windings is due to the differences of time-phase of these circulating currents.

For example, with conventional stator windings, when the transmitter rotor was at 30° from its zero reference, the receiver rotor was at 32° in equilibrium, thus causing 2° error at null. This 2° null error was caused by the stated odd harmonics. Under this condition, there existed 0.150 volt caused by the improper time-phasing of the circulating currents. This was objectionable because it kept the amplifier gain for the motor drive so low that the telemeter was not sufficiently sensitive to give optimum performance. By the means added under the invention, this null-voltage is reduced to less than one-tenth of the 0.150 volt value with a proportional increase in the possible gain and sensitivity and a proportional decrease in the error.

Once the foregoing approach is understood, one can modify the distribution of the turns in the several coils and experimentally determine the closeness with which the truly sinusoidal relation is approached, making successive modifications under the invention until the required accuracy is attained.

But while the foregoing procedure enables one to practice the invention, I have provided the following novel and more direct method of procedure, one which usefully eliminates successive cut-and-try approximations.

Consider the voltage generated by, and the impedance of, a single conducting bar in one stator slot of the 9-slot stator, e. g., of Figure 11, as the angular position of an undefined A. C.-excited rotor is varied. In Figure 12, the heavy curve $E_B$ shows the coupling of the bar to the rotor in volts per bar for 1 volt per turn in the rotor. Since the bar constitutes half of a turn, the maximum coupling factor thus expressed is approximately one-half. The light curves $E_1$ and $E_3$ show the fundamental and the strong 3rd harmonic components.

This can be put into Fourier series form.

$$E_B = E_1 \sin \phi + E_{1'} \cos \phi + E_2 \sin 2\phi + E_{2'} \cos 2\phi \ldots \quad (2)$$

and $$Z = Z_0 + Z_1 \sin \phi + Z_{1'} \cos \phi + Z_2 \sin 2\phi + Z_{2'} \cos 2\phi + \ldots \quad (3)$$

where Z is the conventional mutual impedance or transfer function.

Call the axis of the rotor shaft the $z$ axis, and the axis of the N and S poles the $x$ axis. Then, if the iron core of the rotor, e. g., is both mechanically, magnetically and electrically symmetrical about both the $x$ and $y$ axes, all of the even harmonics, i. e., all of the even sine and cosine terms, and all of the cosine terms drop out and all terms reach a maximum algebraic value at 90°. And $$E_B = E_1 \sin \phi + E_3 \sin 3\phi + E_5 \sin 5\phi + \ldots \quad (4)$$
$$Z = Z_0 + Z_1 \sin \phi + Z_3 \sin 3\phi + Z_5 \sin 5\phi + \ldots \quad (5)$$

Figure 5 shows the four possible independent parallel coils of a 9-slot stator. Referring to Figure 13, the reference axis is chosen 90°/$n$ or 10° from slot a in order to bring the reference axis parallel to the coils, wherein $n$ is the number of stator slots.

As shown in Figure 14, this shifts the fundamental coupling curve of the bars in slot a 10° and the fundamental coupling curve of the bars in slot e by 170° so that the coupling of coil $(n-1)/2$, where $(n-1)/2=4$ is the slot pitch of this coil, is $$N_{(n-1)/2}E_1 \sin\left(\phi+\frac{90°}{n}\right)-$$
$$N_{(n-1)/2}E_1 \sin\left[\phi+\left(180°-\frac{90°}{n}\right)\right]=$$
$$2E_1 \sin\phi\left[\left(N_{(n-1)/2}\cos\frac{90°}{n}\right)\right] \quad (6)$$

where N is the number of turns and the subscript is the slot pitch. For the 9-slot stator this factor is $2E_1 \sin\phi N_4 \cos 10°$. This fundamental coupling factor is shown in Figure 14 and in the vector form of Figure 15.

Likewise the fundamental coupling factor in coil $$\left(\frac{n-3}{2}\right)$$

i. e. of slot-pitch=3, is $$2E_1 \sin\phi N_{(n-3)/2} \cos\frac{90°}{n}$$

For a stator winding, the coupling factor for the fundamental is, in volts for one volt per turn on the rotor $$E_{T1}=2E_1 \sin\phi\left[N_{(n-1)/2}\cos\frac{90°}{n}+N_{(n-3)/2}\cos\frac{90°}{n}+N_{(n-5)/2}\cos\frac{90°}{n}+\cdots N_1 \cos(n-2)\frac{90°}{n}\right] \quad (7)$$

which, for the 9-slot stator, reduces to $$E_{T1}=2E_1 \sin\phi(N_4 \cos 10°+N_3 \cos 30°+ N_2 \cos 50°+N_1 \cos 70°) \quad (8)$$

Similarly for any harmonic $h$ in the coupling curve of Figure 12, the phase of the curve is shifted $h\ 90°/n$ for the bars in slot $a$. Thus the 3rd harmonic of bars in slot $a$ of 9-slot stator shown in Figure 13 is at 3 times 10° or 30° from the zero of the 3rd harmonic curve. The 3rd harmonics of bars in slots $a$ and $e$ are added vectorially as shown in Figure 16 so that the third harmonic in coil 4 of the 9-slot stator is $$2E_3 \sin 3\phi\ (N_4 \cos 30°) \quad (9)$$

This coupling factor may be stated generally for all harmonics as follows:

$$E_{Th}=2E_h \sin h\phi\left[N_{(n-1)/2}\cos h\frac{90°}{n}+N_{(n-3)/2}\cos 3h\frac{90°}{n}+\cdots+N_1 \cos h(n-2)\frac{90°}{n}\right] \quad (10)$$

in volts of stator output for one volt per turn of the rotor winding.

From the above it is readily seen that any given harmonic may be suppressed in at least two different ways: either $E_h \sin h\phi$ may be made zero by modifying the rotor flux distribution, e. g. by properly shaping the rotor, or the term inside the bracket may be made zero by proper distribution of the turns in the stator slots in accordance with Equation 10.

It should be noted that the stator and rotor members may be interchanged or inverted so that a cylindrical rotor having an odd number of slots with a single (or multiple) phase sine winding distributed as outlined above works with a stator having an even number of slots and very simple symmetrical windings. Such windings would be very advantageous when a large number of stator phases is desired.

In Figure 17, the rotor, instead of the stator, is wound to cancel low harmonics under the invention while the stator, instead of the rotor, is bisymmetrical. For this example a single phase winding is placed upon a 7-slot rotor using three parallel coils, or equivalents, wound under the invention, and two normal-phase windings are placed on a 12-slot stator using two parallel coils per phase preferably each of 5-slot pitch. Figure 17 illustrates the invertibility of the rotor and stator.

Figure 18 relies on the shape of the rotor to provide a rotor-flux distribution which eliminates the 5th and 7th harmonics nearly enough for most purposes. The rotor and stator have 40° relative skew (as with the skewed rotor of Fig. 20) for the effectively 9-slot stator, 6 dummy slots complementing 3 coil-containing slots with the coils Y-connected to e. g., eliminate the 3rd harmonic and reduce the amount of required skewing to a practicable amount. This construction permits the unit to be of minimum size under the invention to provide the substantially true sine relation which makes accurate telemetering possible with devices of the self-synchronous servo type disclosed, the rotor faces being closely sine-tapered.

As is evident by inspection of Figure 19, which shows a stator having an odd number $n$ of slots, the maximum number of independent parallel coils is $(n-1)/2$ or 7 for the 15 slots of this stator.

In the use of the modified Fourier procedure, a certain symmetry appears in eliminating harmonics above and below the $n$th harmonic where $n$ is still the number of stator slots.

Consider the $n$th harmonic:

$$\cos h\ 90°/n=\cos n\ 90°/n=\cos 90°=0 \quad (11)$$

Then for harmonic $h'=n+2$ $$\cos h'\ 90°/n=\cos(n+2)\ 90°/n= \cos(90°+180°/n) \quad (12)$$

and for harmonic $h''=n-2$ $$\cos h''\ 90°/n=\cos(n-2)\ 90°/n= \cos(90°-180°/n) \quad (13)$$

It will be seen from Equations 12 and 13 that these terms are symmetrical about the $n$th harmonic since $$\cos(90°+180°/n)=-\cos(90°-180°/n) \quad (14)$$

In this fashion if the $E_{h''}$ for any particular value of $h$ less than $n$ is made zero by distributing the winding to make the bracketed-term zero, then the summation value $E_{h'}$ for an equal order above $n$ is also zero.

For example, with a 9-slot stator, where $E_7$ is made equal to zero, then $E_{11}$ is likewise zero since $$E_7=2E_7 \sin 7\phi(N_4 \cos 70°+N_3 \cos 210°+ N_2 \cos 350°+N_1 \cos 490°)=0 \quad (15)$$

and $$E_{11}=2E_{11} \sin 11\phi(N_4 \cos 110°+N_3 \cos 330°+ N_2 \cos 550°+N_1 \cos 770°)=0 \quad (16)$$

Noting that $\cos 70°=-\cos 110°$
$\cos 210°=-\cos 330°$
$\cos 350°=-\cos 550°=-\cos 190°$
$\cos 490°=\ \cos 130°=-\cos 770°=-\cos 50°$ In other words, the terms $N_4$, $N_3$, $N_2$, $N_1$ are identical in the two equations and the cosine terms have identical numerical values but are of opposite signs.

In regard to the fundamental coupling factor of ladder-type windings, the coupling of, e. g., the 4 slot pitch coil in a 9-slot stator is (1+cos 20°) instead of (2 cos 10°) as explained for a parallel-coil winding, or $$K = \frac{2 \cos 10°}{1 + \cos 20°} = \frac{2 \times .9848}{1 + .9397} = \frac{1.9696}{1.9397} = 1.015$$

In other words, the ladder-coil winding requires 1.5% more turns than its matching parallel-coil winding. While this effect is small, its consideration helps one to perfect the winding distribution.

While generally less desirable, a stator and a rotor both having an even number of slots can be used under the invention by an extension of the foregoing procedure which is considerably extended because it requires consideration of non-parallel coils and hence of both sine and cosine terms of $E_h$. It is not given here because, since this extension involves no new principles, it may be carried out by one skilled in this art after understanding the foregoing explanations. Likewise other ladder-type windings may be made for particular cases under the invention in stators having an odd number of slots.

From the foregoing it is manifest that the invention may be embodied in numerous and diverse forms. For one example, it may be advantageously used with large alternators in which efficiency is raised by the production of a substantially pure sine wave with respect to time. For another it may be simply used with electrical elements which are relatively displaced in translation instead of rotation, e. g. pickups for operating working signals to moving trains. For still another it permits the more accurate modulation of a square-wave input voltage. It also has completely cured a long-standing difficulty with self-synchronous inductive servo systems due to the previously present positional errors and points of high null-voltages spaced at 60° intervals.

When a distribution of bars is worked out which causes all large Fourier harmonic coefficients above the first to cancel, the output of the stator will vary accurately as the sine and the impedance will consist of a constant plus a sine variation which will be zero if the receiver is a skewed cylinder with no electrical load. This will be true regardless of the rotor's shape and flux distribution provided there are no abrupt changes producing appreciable harmonics higher than those neutralized. For all practical rotors this condition is completely met. Only if the rotor is unskewed and subtends an extremely small arc, i. e., flux concentrated angle of less than 30°, will the condition not be met. The only remaining deviations are due to mechanical errors which affect the symmetry and it is now possible in all practical cases to make the theoretical errors vanish into the mechanically produced "background errors."

If desired, a rotor, which has an odd number of slots wound to conform to the distribution for harmonic elimination, may be used, as in Figures 17 and 21, to produce true sine voltages in a stator which has an even number of slots with very simple stator windings of any distribution provided only that these stator windings are symmetrical about both axes normal to the shaft and to each other.

For example, a 7-slot single phase excited rotor, wound to eliminate the 3rd, 5th, 9th and 11th harmonics and working in either a 6-slot 3-phase stator or a 12-slot stator having 1, 2, 3, 4, 6 or 12 phases, gives excellent sine wave output voltages in all phases. This combination, diagrammatically shown in Figure 17, also works out simply and advantageously for a 2-phase telemetric system or for resolving angles into sine and cosine components.

For some purposes, e. g., in a differential-type synchro, the invention may be practiced as in Figure 22 by using a rotor having a 3-phase Y-connected winding which is symmetrical, in the plane of rotation, to two axes normal both to each other and to the axis of rotation (e. g., like the stator winding of Fig. 17) in a stator having a 3-phase Y-connected stator winding with coils whose turns vary directly with the slot pitch (e. g., as in Figures 1, 5 and 6). Or the rotor and stator may be inverted.

In the claims, "stator" and "rotor" have been used to avoid prolixity, and these may accordingly be interchanged without affecting their relative functioning.

If some other wave shape than the sinusoidal is required, it may be provided by using my method. Also the fundamental or first harmonic may be suppressed and a high harmonic be produced by a low-speed generator under my invention.

Where a pair of poles is referred to in the claims, this may be one of a number of bi-poles within the invention.

The breadth of the invention, which appears above, is to be considered in reading the appended claims.

In the claims, a "synchro unit" or "self-synchronous inductive unit" refers to either a transmitter or receiver unit of the sort disclosed in U. S. Patent 2,038,059 to Reichel et al., while a "self-synchronous inductive servo system" has such a unit at the receiver servo-driven as in U. S. Patent 2,240,680 to Stuart and in general also has such a unit at the transmitter. However, the invention may be practiced with such a unit as one of the two telemetric units with the other unit of another sort than that shown in U. S. Patent 2,038,059.

In the claims, where a three-phase synchro winding is stated to be Y-connected or interconnected, it is to be understood that the generated fundamental voltages are in the same time-phase and that any interconnection which eliminates the 3rd, 9th, 15th, . . . , harmonics is to be considered for this purpose the patentable equivalent of the Y-connection disclosed by way of example.

In the claims, an "inductive device," for example a synchro, comprises two relatively movable elements, each element having a plurality of slots in which each element has a winding, each winding has one or more phases, each phase has one or more coils, each coil consists of a stated number of turns, and each turn consists of two conducting bars connected in series and having a direction not parallel with the direction of motion.

This invention is concerned with the position and number of the bars to produce truly sinusoidal coupling between the windings of the elements as related to the relative position of the elements. Considering, e. g., a rotor and stator, the slots and bars are at least approximately parallel with the axis of rotation, being usually more or less skewed.

When in a claim, the winding is stated to be diametral axis which is perpendicular to the bars are symmetrically disposed with respect to a diametrical axis which is perpendicular to the axis of rotation. For example, in Figures 5 and 6, this diametral axis is vertical.

When in the claims, a "parallel, or equivalent, coil" is referred to, "equivalent" means that the numbers and positions of the conducting bars are the same but that the connections which complete the coils are differently arranged although still in series. For one example, the winding of Figure 3 is equivalent to that of Figure 4. While the ladder-winding of Figure 8 is identically equivalent to that of Figure 5 in its coupling relation, it is substantially, although not identically equivalent as to the winding distribution since, due to the slight angularity of the ladder-coils, a few more turns are required by the largest ladder-coils. But the winding of Figure 2 is not equivalent to that in Figure 4 because the positions and numbers of the conducting bars are different.

It should be noted that two bars in the opposite sense in the same slot are equivalent to no bar. It is consequently intended that the term "position" include the sense of the bar.

In the claims, a "bisymmetrical" element or winding is one which is symmetrical about each of two axes which are normal to the axis of rotation and to each other, or, more strictly, to planes including the axis of rotation and with one plane through one of said other axes and the other plane through the other of said other axes. For example, the rotor of Figure 18 is seen by inspection to be bisymmetrical, or symmetrical with respect to both the vertical axis and the horizontal axis, both of said axes being normal to the axis of rotation.

Where a distributed winding is referred to in the claims, this means per phase regardless of whether the total winding for the element is single- or multiple-phase. And where one distributed winding is specified, this means at least one such winding.

Where "harmonic" occurs in the claims, this refers, not to a coupling-time relation, but to a coupling-space relation, i. e. the relation of the inductive coupling to the electrical angle between two elements. Also, "alternating current" is intended to include pure sinusoidal, non-sinusoidal, and pulsating direct current.

Although several embodiments of the invention have been illustrated and described, various changes and modifications in the form and relative arrangement of the parts, which will now appear to those skilled in the art, may be made without departing from the spirit or the scope of the invention. Reference is therefore to be had to the appended claims for a definition of the limits of the invention.

What I claim is:

1. In an electrical device, the combination of two relatively movable inductively coupled elements, one of said elements having a winding distributed into coils with the number of turns in each independent coil substantially in accordance with the distribution determined by the simultaneous solution of a number of equations each of which is equal to zero and represents a to-be-neutralized Fourier harmonic in the relation of the coupling to the relative position of said two elements, each of said equations including a finite series of sinusoidal terms, and each of said terms expressing, for a respective independent coil and for the particular harmonic, the coil's coupling factor as dependent upon both the number of its turns and the effective positions of its conducting bars at any of a number of equally spaced points so that the independent coils have their bars effectively lumped at electrical angles which are integer multiples of the spacing between said points.

2. An electrical A. C. device having relatively movable rotor and stator elements, one of said elements including an electromagnetically bisymmetrical bi-pole with a coil therefor connectable to an A. C. source and characterized in that the other of said elements includes a selected number of independent substantially parallel coils wound symmetrically about an axis normal both to that of said coils and of that of rotation upon a core having an odd number of equally-spaced slots substantially according to the simultaneous solution of a plurality of equations of the formula including the pertinent terms in $$N_{(n-1)/2} \cos h \frac{90°}{n} + N_{(n-3)/2} \cos 3h \frac{90°}{n} + N_{(n-5)/2} \cos 5h \frac{90°}{n} + \cdots + N_1 \cos h(n-2)\frac{90°}{n} = 0$$

where $N$ is the number of turns in a coil of slot pitch indicated by the subscript, $n$ is the odd number of slots in said core, and $h$ is the order of an appreciable odd harmonic to be suppressed, whereby each of the harmonics thus considered is substantially eliminated to obtain a sinusoidal relation between the angle of said rotation and the ratio $E_r/E_i$ of the output and input voltages $E_r$ and $E_i$ respectively.

3. The electrical A. C. device set forth in claim 2 in which the rotor has one less slot than the stator and there is substantially one stator tooth relative skewing between rotor and stator.

4. The electrical A. C. device set forth in claim 2 in which said other element has a 3-phase interconnected winding neutralizing the 3rd harmonic, and the number of coils is reduced below that required for obtaining said substantially sinusoidal fundamental relation without a Y-connection.

5. A synchro unit having a 9-slot stator element and a two-pole bisymmetrical rotor element, characterized in that the stator winding for each phase comprises conducting bars distributed to form more than two independent parallel, or equivalent, coils in which the number of turns per coil increases substantially progressively with the slot pitch to provide a substantially sinusoidal relation between the coupling and the relative angle between said rotor and stator.

6. The synchro unit set forth in claim 5 having four independent coils per phase with 1, 2, 3 and 4 slot pitch coils respectively having substantially 12, 23, 30, and 35 per cent of the total turns per phase.

7. A winding, not necessarily interconnected, for a 9-slot rotor or stator element comprising parallel, or equivalent, independent coils, the turns in each coil having the following respective percentage of the total number of turns in the winding:

| coil, slot pitch | turns, per cent of total per phase |
|---|---|
| 4 | 25 to 40 |
| 3 | 23 to 37 |
| 2 | 15 to 30 |
| 1 | 5 to 20 |

8. The synchro unit set forth in claim 5 having 3 phases interconnected and having three independent coils per phase with 2, 3 and 4 slot pitch coils respectively having substantially 12, 35 and 53 per cent of the total turns per phase.

9. A three-phase Y-connected winding for a 9-slot rotor or stator element, each phase-winding comprising parallel, or equivalent, independent coils, the turns in each coil having the following respective percentage of the total number of turns in the winding:

| coil, slot pitch | turns, per cent of total per phase |
|---|---|
| 4 | 45 to 60 |
| 3 | 25 to 40 |
| 2 | 5 to 20 |

10. The synchro unit set forth in claim 5 having, in a 9-slot element, 2 normal phases with 4 independent coils per phase with 1, 2, 3 and 4 slot pitch coils respectively having substantially 12, 23, 30 and 35 per cent of the total turns per phase, with the coils for one phase parallel and utilizing only 8 of the 9 slots and those for the normal phase being divided to form a ladder-winding utilizing all of the 9 slots and having a total number of turns slightly greater than the total number of turns of the phase to which it is normal so that the increase substantially compensates for the slight decrease of the coupling for the departure of the ladder-wound coils from strict parallelism.

11. A synchro unit having a 15-slot stator and a 2-pole rotor substantially bisymmetrical, characterized in that the stator winding is 3-phase interconected and the winding for each phase comprises bars approximately parallel to the axis of rotation and symmetrically distributed about an axis normal to that of rotation in 6 independent parallel, or equivalent, independent coils of 2, 3, 4, 5, 6 and 7 slot pitch respectively having substantially 2, 6, 13, 20, 27 and 32 per cent of the total turns per phase, whereby all harmonics from above the fundamental through the 27th are substantially eliminated.

12. A 3-phase interconnected winding for a 15-slot rotor or stator element, each phase-winding comprising parallel, or equivalent, independent coils, the turns in each coil having the following respective percentage of the total number of turns in said phase-winding:

| slot pitch | turns, per cent of total per phase |
|---|---|
| 7 | 25 to 37 |
| 6 | 22 to 33 |
| 5 | 15 to 27 |
| 4 | 8 to 18 |
| 3 | 0 to 10 |
| 2 | 0 to 5 |

13. A synchro unit having a 15-slot stator and a substantially bisymmetrical 2-pole rotor characterized in that the stator winding is interconnected 3-phase and with the winding for each phase comprising bars distributed in 5 independent coils of 3, 4, 5, 6 and 7 slot pitch respectively having substantially 6, 11, 22, 28 and 33 per cent of the total turns per phase to provide a substantially sinusoidal relation between the coupling and the relative angle between said rotor and stator.

14. A 3-phase Y-connected winding for a 15-slot rotor or stator element, each phase-winding comprising parallel, or equivalent, independent coils, the turns of each coil having the following respective percentage of the total number of turns in said phase-winding:

| slot pitch | turns, per cent of total per phase |
|---|---|
| 7 | 25 to 40 |
| 6 | 20 to 35 |
| 5 | 15 to 28 |
| 4 | 6 to 16 |
| 3 | 2 to 10 |

15. A synchro unit comprising a stator means and a rotor means, one of said means having an even number of slots and having conducting coil-bars for each phase therein at least approximately parallel to the axis of rotation and bisymmetrically distributed, and the other of said means having an odd number of slots with the conducting coil-bars distributed symmetrically, about an axis normal to the rotor's shaft with the number of turns substantially progressively increasing with the slot pitch to provide a substantially sinusoidal relation between the coupling factor and the relative angle between rotor and stator.

16. A synchro unit comprising a stator means and a rotor means, one of said means having each winding per phase at least approximately parallel to the axis of rotation and bisymmetrically distributed, and the other of said means having an odd number $n$ of slots and not more than $$\frac{n-1}{2}$$

independent parallel, or equivalent, coils per phase wound to substantially eliminate any otherwise unneutralized odd harmonics in the range comprising orders 3 through $(2n-3)$, whereby a substantially sinusoidal relation is provided between the coupling factor and the relative angle between said means.

17. The synchro unit set forth in claim 16 in which the first described winding has a multiplicity of phases with the winding for each phase bisymmetrical.

18. In a differential-type synchro unit, the combination of a rotor element angularly movable relative to an inductively coupled stator element, one of said elements having 9 slots and a 3-phase interconnected winding having parallel, or equivalent, coils wound with the number of turns varying substantially progressively directly with the slot pitch, and the other element having a 3-phase Y-connected winding with the winding for each phase bisymmetrical.

19. A synchro unit comprising a stator means and a rotor means relatively angularly movable with respect to the stator means, one of said means having each winding per phase distributed bisymmetrically, and the other of said means having a single phase winding in at least some of 5 slots to provide 2 independent coils of 1 and 2 slot pitch respectively with the larger number of turns on the 2 slot pitch coil, said coils having conductor bars at least approximately parallel to the axis of rotation and wound symmetrically with respect to an axis normal to that of rotation to substantially eliminate any of the otherwise unneutralized 3rd, 5th and 7th harmonics from the relation between the coupling factor and the relative angle between said means.

20. A self-synchronous inductive unit comprising a stator means and a rotor means, one of said means having each winding per phase distributed bisymmetrically and the other of said means having 7 slots, a single-phase winding in at least some of said slots to provide not more than 3 independent at-least-approximately parallel coils of not more than 3 slot pitch, and wound bisymmetrically about an axis normal to both the named coils and the shaft of the rotor means and with the turns of said coils distributed to substantially eliminate any otherwise unneutralized harmonics in the range comprising the third order through the 11th from the relation between the coupling factor and the relative angle between said means.

21. A synchro unit comprising a stator means and a rotor means, one of said means having each winding per phase distributed bisymmetrically and the other of said means having 9 slots with a winding per phase in either 8 or 9 of said slots to provide not more than 4 independent coils per phase, whether the coils are divided or not, of not more than 4 slot pitch, with the number of turns increasing with the slot pitch, and wound symmetrically about an axis normal to both the last-named coils and the shaft of the rotor means to substantially eliminate any otherwise unneutralized harmonics from the 3rd through the 15th from the relation between the coupling factor and the relative angle between said means.

22. In an electrical alternating current device having two inductively coupled relatively movable elements, a winding on at least one of said elements distributed to have B, the average number of the conductor bars of said winding per electrical degree, vary with the electrical angle of the bars from a neutral-coupling axis over a range of up to 90 electrical degrees in both directions between such limits that B is within plus or minus 10 per cent, with percentages based on $B_{max}$, of values given by the following expression:

$$B/B_{max} = -0.4 + 1.4 SP/SP_{max}$$

where B is the average number of conductor bars per electrical degree for the series-connected bars separated by the electrical angle SP whether expressed by the number of electrical degrees or by the "slot-pitch" if the bars are in evenly spaced positions, and $B_{max}$ is the maximum value of B for the series-connected bars separated by the largest electrical angle $SP_{max}$ consistently expressed, whereby pure sinusoidal coupling between said elements tends to be produced when said ratio $B/B_{max}$ approaches said expression and the third harmonic is otherwise eliminated.

23. In an electrical alternating current device having two inductively coupled relatively movable elements, a winding on at least one of said elements distributed to have the average number of the conductor bars of said winding per electrical degree vary with the electrical angle of the bars from a neutral-coupling reference position over a range of up to 90 electrical degrees substantially according to the solution of a determinant which includes a number of equations each of which is equal to zero and represents a to-be-neutralized harmonic in the relation of the coupling to the relative position of said two elements, each of said equations including a finite series of sinusoidal terms, and each of said terms expressing, for each bar and the particular harmonic, the bar's coupling factor as dependent upon its electrical angle from the reference position.

24. An electrical alternating current device having two inductively coupled relatively movable elements having windings, one of said elements being constructed to have an integral number of evenly spaced slots per an integral number times 360 electrical degrees and its winding in a selected number of said slots with a number of turns of each independent coil of different slot-pitch, the number of turns of each such coil being substantially in accordance with the solution of a determinant which includes a number of equations each of which is equal to zero and represents a to-be-neutralized harmonic in the relation of the coupling to the relative position of said two elements, each of said equations including a finite series of sinusoidal terms, and each of said terms expressing, for each independent coil and the particular harmonic, the coil's coupling factor as dependent upon its slot-pitch.

25. An alternating current winding in an electrical device having two inductively coupled relatively movable elements of high permeability, one element of which is provided with an integral number of evenly spaced slots per 360 electrical degrees for the conductor bars of the coils of said winding and the other of said elements is bisymmetrical, said winding having a number N of turns of each independent coil of slot-pitch SP with each such coil's series-coupled bars located substantially symmetrically about the middle of the coil of maximum slot-pitch $SP_{max}$ and maximum number $N_{max}$ of turns within a range of less than 90 electrical degrees from the stated middle position, the number N of turns of each independent coil being within plus 20 or minus 10 per cent, based on $N_{max}$, of the values according to the following relation:

$$N/N_{max} = -0.4 + 1.4 SP/SP_{max}$$

whereby pure sinusoidal coupling between said elements tends to be produced when the third harmonic is otherwise eliminated.

26. In an electrical alternating current device having two inductively coupled relatively movable windings, one of said windings having its conductor bars distributed in a selected number of a number of equally spaced electrical angular positions with the relative number of bars in each of the stated used positions within plus and minus 10 per cent based on the maximum number of bars in any one position, respectively, of the number determined by $$B/B_{max} = -0.4 + 1.4 EA/EA_{max}$$

where B is the number of bars in any of said used positions which is at an electrical angle EA from the neutral-coupling axis, and $B_{max}$ is the number of bars in the used position at the largest electrical angle $EA_{max}$ from the neutral-coupling axis, whereby pure sinusoidal coupling between said windings tends to be produced when the number according to said equation is approached when the third harmonic is otherwise eliminated.

27. The substantially parallel coil winding set forth in claim 2, in which the number of turns in each of the used independent coils is within plus-or-minus 20 per cent, based on the largest number of turns in any used coil, of the number determined by the stated solution.

28. The substantially parallel coil winding set forth in claim 2, in which the number of turns in each of the used independent coils is within plus-or-minus 10 per cent, based on the largest number of turns in any used coil, of the number determined by the stated solution.

29. The substantially parallel coil winding set forth in claim 2, in which the number of turns in each of the used independent coils is within plus-or-minus 5 per cent, based on the largest number of turns in any used coil, of the number determined by the stated solution.

30. The substantially parallel coil windings set forth in claim 2, in which the number of turns in each of the used independent coils is within plus-or-minus 4 turns of the number determined by the stated solution.

31. The substantially parallel coil winding set forth in claim 2, in which the number of turns in each of the used independent coils is within plus-or-minus 2 turns of the number determined by the stated solution.

32. The substantially parallel coil winding set forth in claim 2, in which the number of turns in each of the used independent coils is within plus-or-minus 1 turn of the number determined by the stated solution.

33. A synchro unit comprising two relatively rotatable elements including windings in inductive coupling relation, one of said elements being symmetrical about an axis perpendicular to the axis of rotation and the other being symmetrical about two other axes which are perpendicular to each other and to said axis of rotation, the first-named element containing $3n$ effective equally spaced slots carrying coils of the winding of said element, where $n$ is an integer larger than unity, said elements being relatively skewed to substantially eliminate the slot-harmonic of the order $3n$, said elements being so constructed that one of them materially reduces at least one odd harmonic lower than said slot-harmonic but including the third and the other of said elements materially reduces at least two such harmonics, and the winding of either element being three-phase and comprising one effective coil per phase, with said last-named coils interconnected to eliminate the third harmonic.

34. The synchro unit set forth in claim 33, in which at least the first-named element has the stated three-phase winding.

35. In a telemetric system including a transmitter synchro and a receiver synchro in which a harmonic $h_c$ of the telemetric error is minimized by predetermined values of the amplitudes of harmonics $h_c \pm 1$ of the relation between the inductive coupling factor and the angular displacement of the elements of one of said synchros, a winding for said synchro comprising coils with their conductors distributed in some of a number $n$ of equally spaced angular positions on one of said elements substantially in accordance with the solution together of equations for harmonics $h_c \pm 1$, each of which equations includes on one side at least two terms of the summational expression $$N_{(n-1)/2} \cos h\frac{90°}{n} +$$

$$N_{(n-3)/2} \cos 3h\frac{90°}{n} + \cdots + N_1 \cos h(n-2)\frac{90°}{n}$$

where N is the number of turns in a coil of the slot-pitch indicated by the respective subscript and $h$ is the order of the harmonic, and the values on the other sides of said equations are proportional to the respective predetermined values of the amplitudes of coupling-harmonics $h_c \pm 1$ for minimizing the error-harmonic $h_c$.

36. In a synchro unit, the combination of a rotor element angularly movable relative to an inductively coupled stator element, one of said elements having 9 slots and a 3-phase interconnected winding having parallel, or equivalent, coils wound with the number of turns varying substantially progressively directly with the slot pitch, and the other element having a 3-phase interconnected winding with the winding for each phase bisymmetrical.

37. In a synchro unit, the combination of a rotor element angularly movable relative to an inductively coupled stator element, one of said elements having 9 slots and a 3-phase Y-connected winding having parallel, or equivalent, coils wound with the number of turns varying substantially progressively directly with the slot pitch, and the other element having a 3-phase Y-connected winding with the winding for each phase bisymmetrical.

38. In a synchro unit, the combination of a rotor element angularly movable relative to an inductively coupled stator element, one of said elements having 9 slots and a 3-phase Y-connected winding having parallel, or equivalent, coils wound with the number of turns varying substantially progressively directly with the slot pitch, and the other element having a 3-phase interconnected winding with the winding for each phase bisymmetrical.

JOHN P. GLASS, Jr.

REFERENCES CITED

The following references are of record in the file of this patent:

UNITED STATES PATENTS

| Number | Name | Date |
|---|---|---|
| 1,477,827 | Hildebrande | Dec. 18, 1923 |

FOREIGN PATENTS

| Number | Country | Date |
|---|---|---|
| 12,390 | Great Britain | of 1908 |
| 25,465 | Great Britain | of 1908 |
| 170,850 | Great Britain | of 1923 |
| 306,099 | Great Britain | of 1929 |
| 395,764 | Great Britain | of 1933 |
| 373,253 | Italy | July 22, 1939 |